United States Patent
Kao et al.

(10) Patent No.: US 10,870,237 B2
(45) Date of Patent: Dec. 22, 2020

(54) POWDER SUPPLY DEVICE FOR USE WITH POWDER SPREADERS

(71) Applicant: TONGTAI MACHINE & TOOL CO., LTD., Luzhu Kaohsiung (TW)

(72) Inventors: Huaien Kao, Luzhu Kaohsiung (TW); Hsinpao Chen, Luzhu Kaohsiung (TW); Juihsiung Yen, Luzhu Kaohsiung (TW)

(73) Assignee: TONGTAI MACHINE & TOOL CO., LTD., Luzhu Kaohsiung (TW)

( * ) Notice: Subject to any disclaimer, the term of this patent is extended or adjusted under 35 U.S.C. 154(b) by 0 days.

(21) Appl. No.: 16/346,728

(22) PCT Filed: Nov. 15, 2016

(86) PCT No.: PCT/CN2016/105910
§ 371 (c)(1),
(2) Date: May 1, 2019

(87) PCT Pub. No.: WO2018/090186
PCT Pub. Date: May 24, 2018

(65) Prior Publication Data
US 2020/0055245 A1    Feb. 20, 2020

(51) Int. Cl.
| | |
|---|---|
| *B29C 64/321* | (2017.01) |
| *B29C 64/241* | (2017.01) |
| *B29C 64/255* | (2017.01) |
| *B29C 64/343* | (2017.01) |
| *B29C 64/329* | (2017.01) |
| *B33Y 40/00* | (2020.01) |

(52) U.S. Cl.
CPC .......... *B29C 64/321* (2017.08); *B33Y 40/00* (2014.12)

(58) Field of Classification Search
None
See application file for complete search history.

(56) References Cited

U.S. PATENT DOCUMENTS

| 3,270,102 A * | 8/1966 | Aiken ............ C04B 33/32 |
| | | 264/452 |
| 5,121,329 A * | 6/1992 | Crump ............ G05B 19/4099 |
| | | 700/119 |
| 5,340,433 A * | 8/1994 | Crump ............ G05B 19/4099 |
| | | 156/578 |
| 5,902,537 A * | 5/1999 | Almquist ............ B33Y 30/00 |
| | | 264/401 |

(Continued)

FOREIGN PATENT DOCUMENTS

| CN | 1283578 A | 2/2001 |
| CN | 2767104 Y | 3/2006 |

(Continued)

*Primary Examiner* — Jacob T Minskey
*Assistant Examiner* — Baileigh Kate Darnell

(57) ABSTRACT

A powder supply device (100) for use with powder spreaders, comprising: a fixation base (2), a powder storage unit (3), a powder supply unit (4) and a driving unit (5), wherein the powder supply unit (4) is provided with at least one stirring bar (41) and a powder spreading roller (42); using a design of a stirring bar and the powder spreading roller, powder may be stirred and extruded such that the powder becomes finer, more uniform, and does not cake during powder spreading.

7 Claims, 5 Drawing Sheets

(56) References Cited

U.S. PATENT DOCUMENTS

| | | | | |
|---|---|---|---|---|
| 8,523,554 | B2* | 9/2013 | Tung | B29C 64/20 |
| | | | | 425/217 |
| 9,878,371 | B2 | 1/2018 | Varetti | |
| 9,937,639 | B2* | 4/2018 | Chen | B33Y 40/00 |
| 2002/0090313 | A1* | 7/2002 | Wang | B33Y 30/00 |
| | | | | 419/10 |
| 2005/0280185 | A1* | 12/2005 | Russell | B33Y 30/00 |
| | | | | 264/308 |
| 2010/0247742 | A1* | 9/2010 | Shi | B33Y 40/00 |
| | | | | 427/8 |
| 2011/0215117 | A1* | 9/2011 | Huang | G01F 11/20 |
| | | | | 222/233 |
| 2011/0300248 | A1 | 12/2011 | Tung et al. | |
| 2012/0052145 | A1* | 3/2012 | Chen | B08B 15/026 |
| | | | | 425/217 |
| 2015/0308741 | A1 | 10/2015 | Chen et al. | |
| 2016/0368215 | A1 | 12/2016 | Miyano et al. | |
| 2019/0079432 | A1 | 3/2019 | Hosokawa et al. | |

FOREIGN PATENT DOCUMENTS

| | | |
|---|---|---|
| CN | 101850326 A | 10/2010 |
| CN | 101885062 A | 11/2010 |
| CN | 201685457 U | 12/2010 |
| CN | 202010779 U | 10/2011 |
| CN | 102514950 A | 6/2012 |
| CN | 103173759 A | 6/2013 |
| CN | 104067180 A | 9/2014 |
| CN | 104625062 A | 5/2015 |
| CN | 105014822 A | 11/2015 |
| CN | 105583400 A | 5/2016 |
| CN | 105903966 A | 8/2016 |
| CN | 205673592 U | 11/2016 |
| EP | 0651096 A1 | 5/1995 |
| JP | S57-135211 U | 8/1982 |
| JP | 3151552 U | 6/2009 |
| JP | 2010076847 A | 4/2010 |
| JP | 2014188758 A | 10/2014 |
| KR | 20150094312 A | 8/2015 |
| WO | 2016135975 A1 | 9/2016 |

* cited by examiner

_US 10,870,237 B2_

POWDER SUPPLY DEVICE FOR USE WITH POWDER SPREADERS

FIELD OF INVENTION

The present disclosure relates to a powder supply device, and in particular, to the powder supply device of a powder spreading apparatus applied in three-dimensional (3D) printing.

BACKGROUND OF INVENTION

A main technical content of three-dimensional rapid prototyping (3D printing) is to put data and raw materials into 3D printers, and a final product is formed by printing layer by layer through a powder spreading device. 3D printing mainly includes selective laser sintering (SLS), selective laser melting (SLM), direct metal laser sintering (DMLS), electron beam melting (EBM), and other technologies. SLS uses a low-power laser to sinter low-melting polymer powder. SLM uses a high-energy beam laser to directly melt metal powder. DMLS uses a laser to sinter binary metal. EBM uses an electron beam to melt metal powder.

However, the existing powder spreading apparatus generally uses a powder roller or a scraper. Although the powder spreading apparatus can also realize functions of powder feeding and powdering, the powder roller or scraper is easier to lay the powder loose. That is, gaps between the powder particles is large, and the powder is released unevenly. Therefore, a three-dimensional (3D) molded product manufactured by the loose powder has poor compactness and affects the mechanical properties of the 3D molded product.

As a result, it is necessary to provide a powder supply device of a powder spreading apparatus to solve the problems existing in the conventional technologies as described above.

SUMMARY OF INVENTION

An object of the present disclosure is to provide a powder supply device of a powder spreading apparatus, wherein.

To achieve the above objects, the present disclosure provides a powder supply device of a powder spreading apparatus. The powder supply device comprises a holder, a powder storage unit, a powder supply unit, and a driving unit. The powder storage unit includes a barrel and an outlet, wherein the barrel is disposed on the holder and configured to store powder, and the outlet is formed on a lower edge of the barrel and configured to output the powder. The powder supply unit includes at least one stir bar and a powder roller, wherein the stir bar is pivoted on the holder and located below the outlet, and the powder roller is pivoted on the holder and located below the stir bar. The driving unit includes a motor and a linkage assembly, wherein the motor is configured to drive the linkage assembly to rotate the stir bar and the powder roller.

In one embodiment of the present disclosure, the powder supply unit further includes a scraper disposed on the holder and located below the powder roller.

In one embodiment of the present disclosure, the stir bar includes a screw and a threaded portion, and the threaded portion is formed on an outer circumferential surface of the screw.

In one embodiment of the present disclosure, the powder roller includes a rod and plurality of receiving slots, and the receiving slots are spaced and concaved on an outer circumferential surface of the rod.

In one embodiment of the present disclosure, a section width of the barrel is tapered toward the outlet.

In one embodiment of the present disclosure, the linkage assembly includes a ratchet disposed on the holder and configured to drive the powder roller rotating.

In one embodiment of the present disclosure, the linkage assembly includes a reducer configured to drive the stir bar and the powder roller rotating, so that a number of rotations of the powder roller is less than a number of rotations of the stir bar.

In one embodiment of the present disclosure, the powder supply unit includes two stir bars, a gap is formed between the two stir bars, and the powder roller is located below the gap.

In one embodiment of the present disclosure, the linkage assembly includes a plurality of wheels and at least one belt, the wheels are mounted on the stir bar, the powder roller and the motor, respectively, and the belt is disposed on the wheels.

In one embodiment of the present disclosure, the motor is a stepper motor or a servo motor.

As described above.

DETAILED DESCRIPTION OF PREFERRED EMBODIMENTS

The structure and the technical means adopted by the present disclosure to achieve the above and other objects can be best understood by referring to the following detailed description of the preferred embodiments and the accompanying drawings. Furthermore, directional terms described by the present disclosure, such as upper, lower, front, back, left, right, inner, outer, side, longitudinal/vertical, transverse/horizontal, etc., are only directions by referring to the accompanying drawings, and thus the used directional terms are used to describe and understand the present disclosure, but the present disclosure is not limited thereto.

Figure 1:
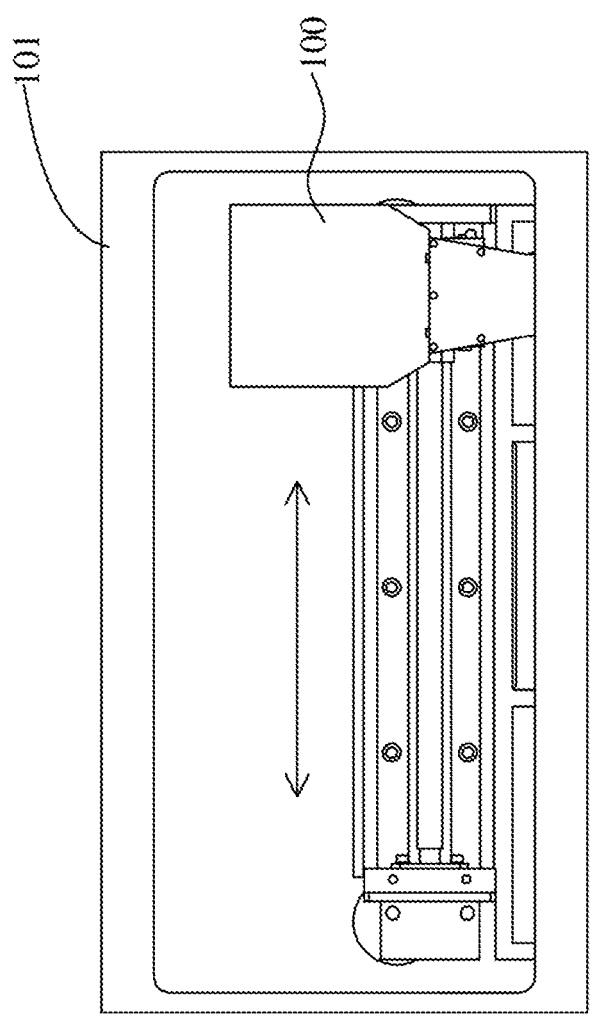
FIG. 1 is a perspective view of a powder supply device of a powder spreading apparatus in an operating status according to a preferred embodiment of the present disclosure.
Figure 3:
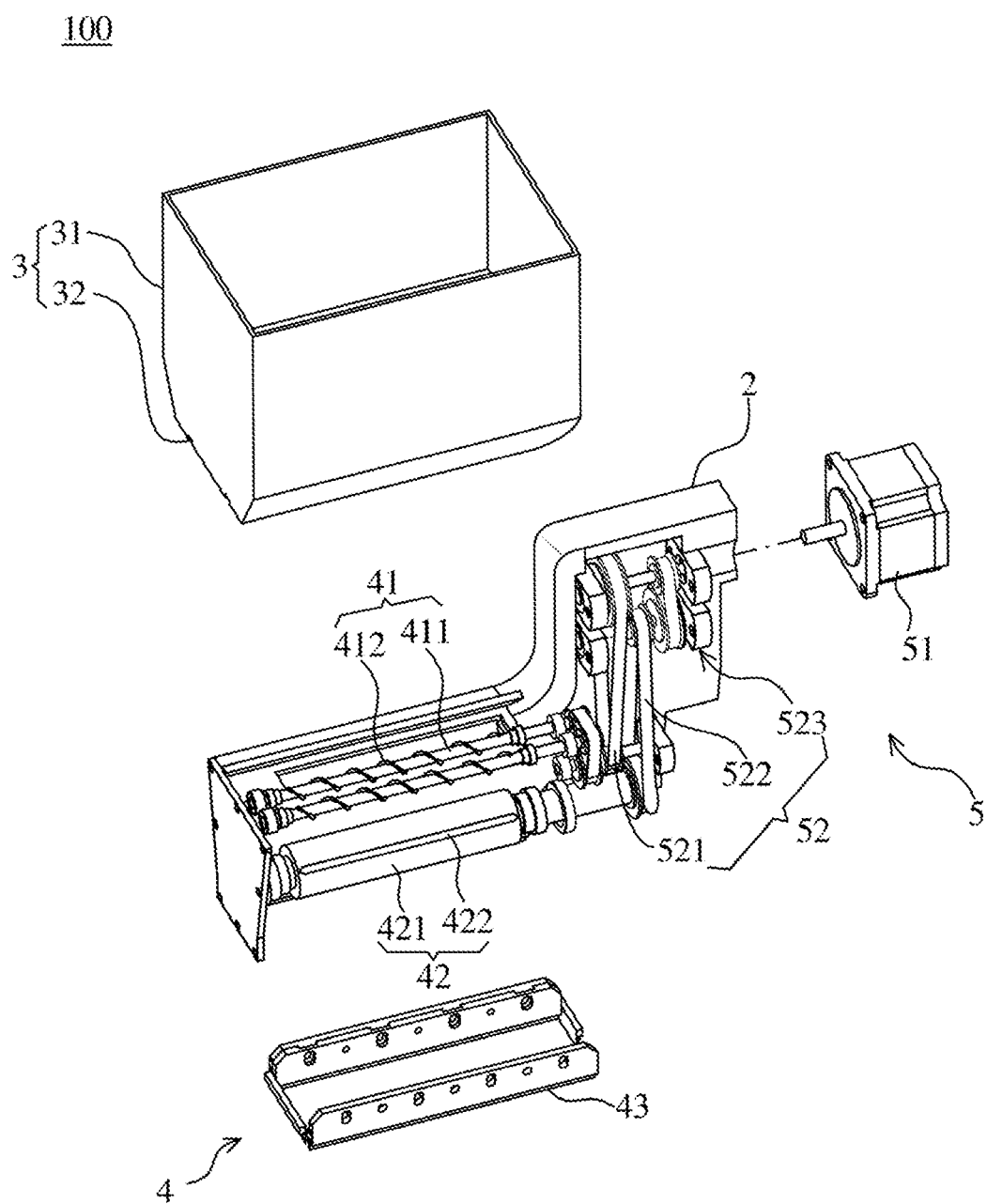
FIG. 3 is an exploded view of the powder supply device of the powder spreading apparatus according to the preferred embodiment of the present disclosure.

Referring to FIGS. 1 and 3, a powder supply device of a powder spreading apparatus according to a preferred embodiment of the present disclosure is illustrated. The powder supply device 100 is assembled in a work box 101 of the spreading apparatus. The powder supply device 100 includes a holder 2, a powder storage unit 3, a powder supply unit 4, and a driving unit 5. The detailed structure of each component, assembly relationships, and operating principles in the present disclosure will be described in detail hereinafter.

Figure 2:
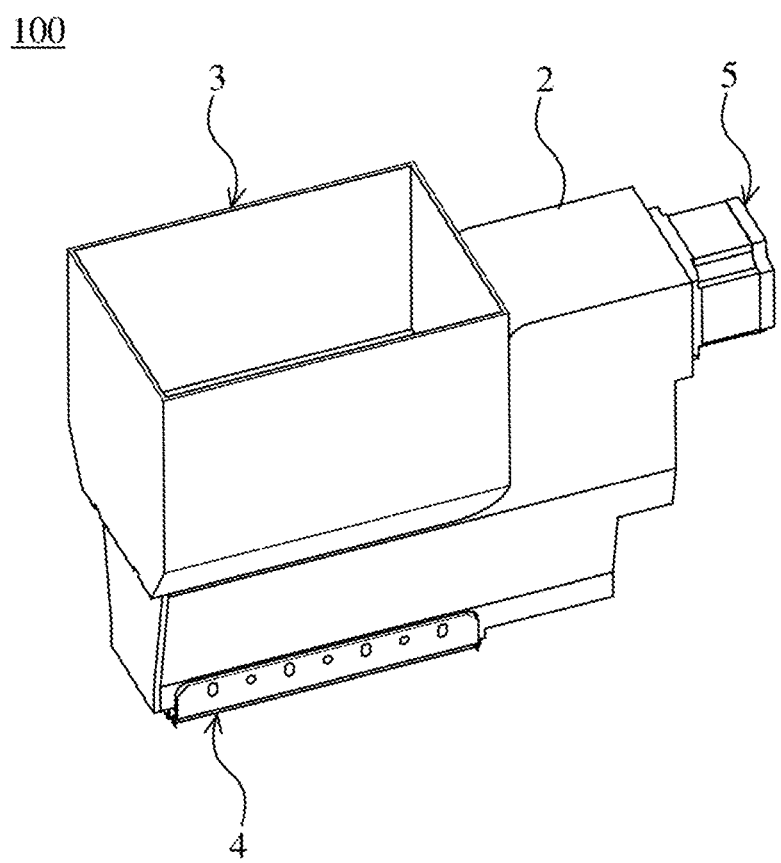
FIG. 2 is a perspective view of the powder supply device of the powder spreading apparatus according to the preferred embodiment of the present disclosure.

Referring to FIGS. 2 and 3, the holder 2 is a hollow housing, assembled in the work box 101, and configured to provide an operator to move left or right as shown by the arrow in FIG. 1. It is possible to achieve an operation of spreading powder in the work box 101.

Referring to FIGS. 2 and 3, the powder storage unit 3 includes a barrel 31 and an outlet 32, wherein the barrel 31 is disposed on the holder 2 and configured to store powder, and the outlet 32 is formed on a lower edge of the barrel 31 and configured to output the powder. In the embodiment, a section width of the barrel 31 is tapered toward the outlet 32.

Referring to FIGS. 2 and 3, the powder supply unit 4 includes two stir bars 41, a powder roller 42, and a scraper 43, wherein each of the stir bars 41 is pivoted on the holder 2 and located below the outlet 32 of the powder storage unit 3, a gap is formed between the two stir bars 41. The powder roller 42 is pivoted on the holder 2 and the powder roller 42 is located below the gap. The scraper 43 is disposed on the holder 2 and located below the powder roller 42. In the embodiment, each of the stir bars 41 includes a screw 411 and a threaded portion 412, and the threaded portion 412 is formed on an outer circumferential surface of the screw 411. The powder roller 42 includes a rod 421 and a plurality of receiving slots 422, and the receiving slots 422 are spaced and concaved on an outer circumferential surface of the rod 421.

Referring to FIGS. 2 and 3, the driving unit 5 includes a motor 51 and a linkage assembly 52, wherein the motor 51 is configured to drive the linkage assembly 52 to rotate the stir bars 41 and the powder roller 42. In the embodiment, the motor 51 is a stepper motor or a servo motor. The linkage assembly 52 includes a plurality of wheels 521 and a plurality of belts 522, wherein the wheels 521 are mounted on the stir bars 41, the powder roller 42, and the motor 51, respectively, and the belts 522 is disposed on the wheels 521. In addition, the linkage assembly 52 further includes a reducer 523 configured to drive the stir bars 41 and the powder roller 42 rotating, so that a number of rotations of the powder roller 42 is less than a number of rotations of the stir bar 41 in a particular period. The stir bars 41 are configured to agitate the powder and distribute the powder evenly. The powder roller 42 receives a predetermined amount of powder through the receiving slots 422, thereby controlling the feeding amount of the powder.

According to the above structure, the powder contained in the barrel 31 is output from the outlet 32, the powder passes through the stir bars 41, and the threaded portion 412 of the stir bars 41 agitates and squeezes the powder. Therefore, the powder can be finer and avoid caking, thereby uniformly distributing the powder. Then the powder falls onto the powder roller 42 and accumulates in the receiving slots 422. When the receiving slots 422 are rotated downward with the rod 421, the amount of the powder can be controlled to be laid down quantitatively, thereby completing the operation of the powder spreading. It should be noted that, by the design of the reducer 523, the number of the rotations of the powder roller 42 is smaller than the number of the rotations of the stir bars 41 during rotation. It is possible to prevent the powder of the barrel from accumulating when it is dropped to form a concave-convex shape, so that the powder supply device 100 can achieve a more uniform powder spreading effect.

As described above, the powder supply device 100 of the present disclosure utilizes the design of the stirring rod 41 and the powder roller 42 to enable the powder of the barrel 31 to be agitated and squeezed. By uniformly accumulating the powder by the powder roller 42, it is possible to make the powdered powder finer and to avoid caking of the powder. In addition, the rotation speeds of the stir bars 41 and the powder roller 42 are different, and the stir bars 41 agitate the powder to make the powder uniform. The powder roller 42 receives a quantitative powder through the receiving slots 422, and can effectively control the feeding amount of the powder. Therefore, the powder supply device 100 can achieve a better powder spreading effect.

Figure 4:
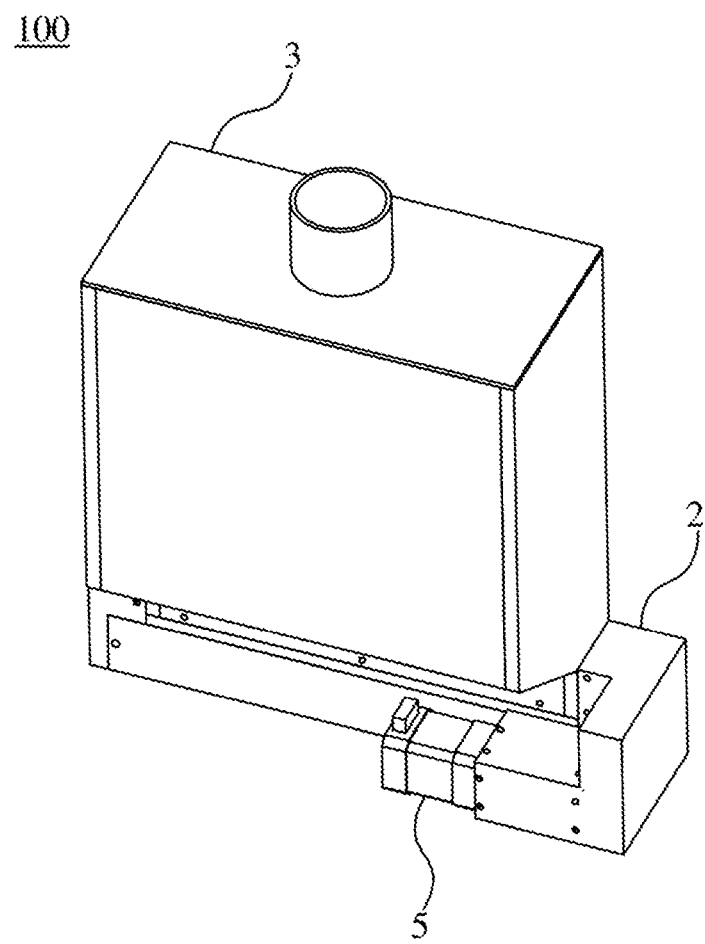
FIG. 4 is a perspective view of a powder supply device of a powder spreading apparatus according to another preferred embodiment of the present disclosure.
Figure 5:
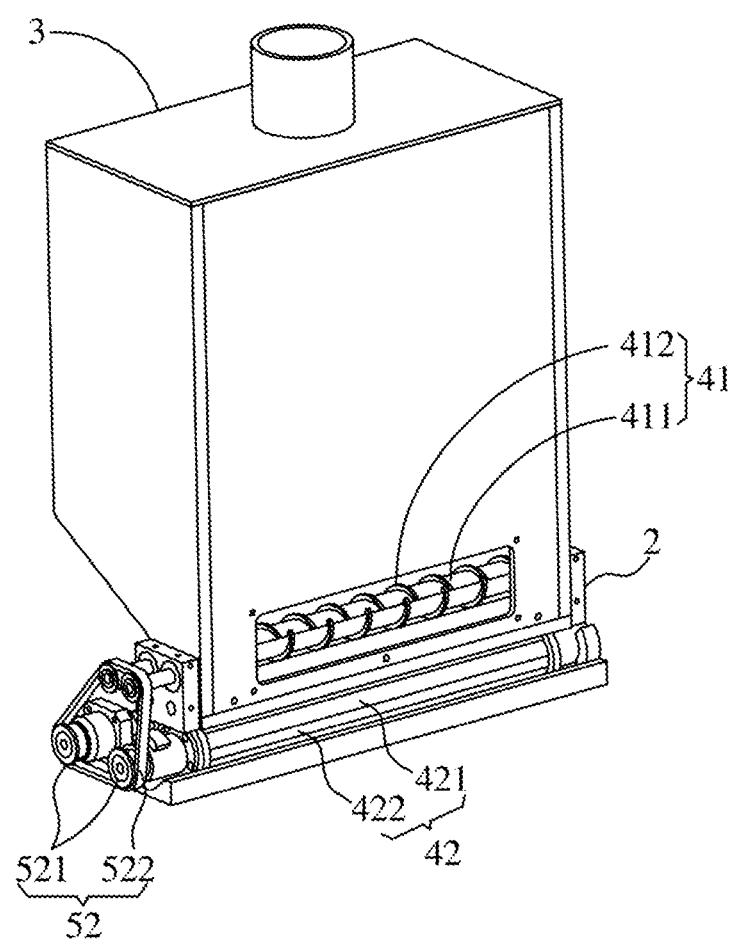
FIG. 5 is a perspective view of a powder supply device of a powder spreading apparatus according to another preferred embodiment of the present disclosure.

Referring to FIGS. 4 and 5, a powder supply device of a powder spreading apparatus according to a second embodiment of the present disclosure is illustrated, and is similar to the first embodiment, so that the second embodiment uses terms or numerals similar to those of the first embodiment. The difference of the second embodiment is that the linkage assembly 52 includes a plurality of wheels 521 and a belt 522, wherein the wheels 521 are mounted on the stir bars 41, the powder roller 42, and the motor 51, respectively, and the wheel 521 for driving the powder roller 42 is a ratchet and configured to provide on the holder 2. Therefore, when the motor 51 rotates, the belt 522 is driven to drive the stir bars 41 to rotate, and the belt 522 also drives the powder roller 42 to rotate, that is, the number of rotations of the powder roller 42 and the number of rotations of the stir bars 41 are the same.

As described above, the powder supply device 100 of the present disclosure utilizes the design of the stirring rod 41 and the powder roller 42 to enable the powder of the barrel 31 to be agitated and squeezed. By uniformly accumulating the powder by the powder roller 42, it is possible to make the powdered powder finer and to avoid caking of the powder. In addition, the powder supply device 100 of the present disclosure can also achieve a design for reducing the volume of the reducer, thus providing another embodiment.

The present disclosure has been described with preferred embodiments thereof and it is understood that many changes and modifications to the described embodiments can be carried out without departing from the scope and the spirit of the disclosure that is intended to be limited only by the appended claims.

What is claimed is:

1. A powder supply device of a powder spreading apparatus, comprising:
   a holder;
   a powder storage unit including a barrel disposed on the holder and configured to store powder, and an outlet formed on a lower edge of the barrel and configured to output the powder;
   a powder supply unit including at least one stir bar pivoted on the holder and located below the outlet, and a powder roller pivoted on the holder and located below the stir bar; and
   a driving unit including a motor and a linkage assembly, wherein the motor is configured to drive the linkage assembly to rotate the stir bar and the powder roller, wherein the linkage assembly includes a ratchet, a reducer, a plurality of wheels, and at least one belt, the ratchet is disposed on the holder and configured to drive the powder roller rotating, the reducer is configured to drive the stir bar and the powder roller rotating, so that a number of rotations of the powder roller is less than a number of rotations of the stir bar, and the wheels are mounted on the stir bar, the powder roller, and the motor, respectively, and the belt is disposed on the wheels.

2. The powder supply device of the powder spreading apparatus according to claim 1, wherein the powder supply unit further includes a scraper disposed on the holder and located below the powder roller.

3. The powder supply device of the powder spreading apparatus according to claim 1, wherein the stir bar includes a screw and a threaded portion, and the threaded portion is formed on an outer circumferential surface of the screw.

4. The powder supply device of the powder spreading apparatus according to claim 1, wherein the powder roller includes a rod and a plurality of receiving slots, and the receiving slots are spaced and concaved on an outer circumferential surface of the rod.

5. The powder supply device of the powder spreading apparatus according to claim 1, wherein a section width of the barrel is tapered toward the outlet.

6. The powder supply device of the powder spreading apparatus according to claim 1, wherein the powder supply unit includes two stir bars, a gap is formed between the two stir bars, and the powder roller is located below the gap.

7. The powder supply device of the powder spreading apparatus according to claim 1, wherein the motor is a stepper motor or a servo motor.

* * * * *